United States Patent [19]
Keintzel et al.

[11] Patent Number: 5,904,138
[45] Date of Patent: May 18, 1999

[54] METHOD FOR GENERATING STEAM WITH CONCENTRATED SOLAR RADIATION AND SOLAR APPARATUS THEREFOR

[75] Inventors: Günter Keintzel, Engelskirchen; Horst-Dieter Oldenburg, Gummersbach; Manfred Schmitz-Goeb, Gummersbach; Karl-Heinz Dinstühler, Gummersbach, all of Germany

[73] Assignee: L. & C. Steinmüller GmbH, Gummersbach, Germany

[21] Appl. No.: 08/444,389

[22] Filed: May 19, 1995

[30] Foreign Application Priority Data

May 20, 1994 [DE] Germany ................. 4417656

[51] Int. Cl.$^6$ ................................. F02P 9/00
[52] U.S. Cl. ........................... 126/617; 126/609
[58] Field of Search ................ 126/647, 617, 126/643, 609; 60/641.14, 641.15, 659

[56] References Cited

U.S. PATENT DOCUMENTS

| | | | |
|---|---|---|---|
| 3,993,041 | 11/1976 | Diggs | 123/647 |
| 4,222,369 | 9/1980 | Jubb et al. | 126/643 |
| 4,546,758 | 10/1985 | Ebernard | 126/680 |

FOREIGN PATENT DOCUMENTS

| | | |
|---|---|---|
| 2812651 | 9/1978 | Germany. |
| 2945969 | 5/1981 | Germany. |
| 230987 | 2/1990 | Japan. |

OTHER PUBLICATIONS

Verlag C. F. Müller Karlsruhe; Second Generation Central Receiver Technologies; 1993.

*Primary Examiner*—Noah P. Kamen
*Attorney, Agent, or Firm*—Robert W. Becker & Associates

[57] ABSTRACT

The method for generating steam with concentrated solar radiation includes the step of heating an absorber by solar radiation and directing a stream of air through the absorber to produce a heated air. The heated air is guided through a heat storage device provided for compensating short-term temperature fluctuations. Steam is generated with the heated air and is thereby cooled. At least a portion of the cooled air is returned to the upstream side of the absorber. The device for preforming the method includes a tower having an air heating device with a solar radiation absorber connected to the top of the tower. An air inlet for introducing air into the air heating device is provided. A steam generator is connected to the tower downstream of the air heating device. A heated air channel is arranged at the tower for guiding the heated air from the air heating device to the steam generator. A blower is connected to the tower downstream of the steam generator and a connecting line connects the steam generator to the blower. A return line is arranged at the tower for connecting the blower to the air inlet and returning at least a portion of the cooled air to the air heating device.

24 Claims, 6 Drawing Sheets

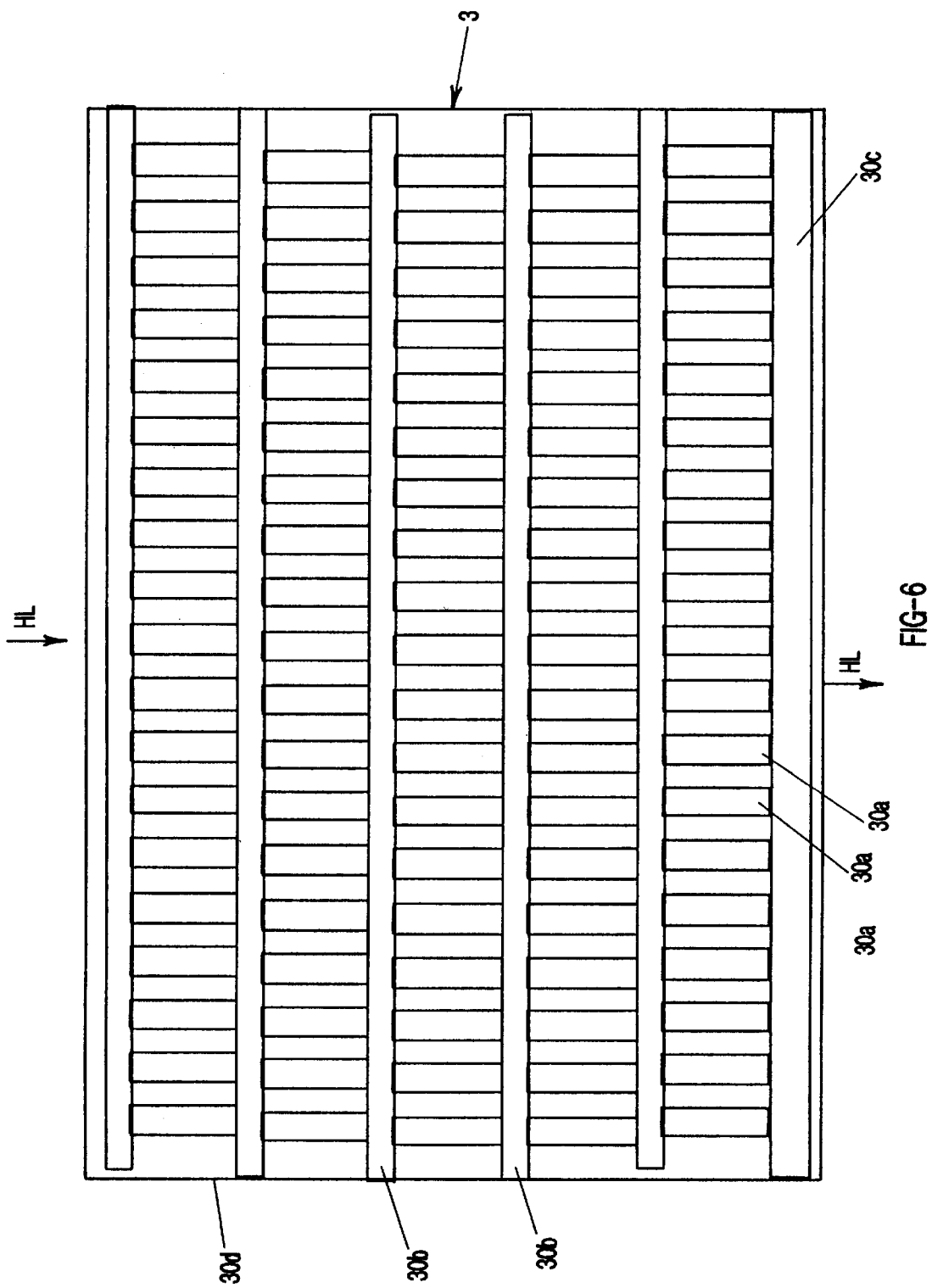

5,904,138

METHOD FOR GENERATING STEAM WITH CONCENTRATED SOLAR RADIATION AND SOLAR APPARATUS THEREFOR

BACKGROUND OF THE INVENTION

The present invention relates to a method for generating steam with concentrated solar radiation in which a stream of air is guided through an absorber of an air heating device heated by concentrated solar radiation and heated by passing through the absorber, the heated airstream is then cooled by generating steam and at least a portion of the cooled air stream is returned to the upstream side of the absorber.

In the book "Second Generation Central Receiver Technologies" (Becker, Klimas, published by Deutsche Forschungsanstalt für Luft-und Raumfahrt, Verlag C. F. Muller GmbH, Karlsruhe 1993, Pages 1–2, FIGS. 1–2) such a method is disclosed. When using a volumetric air heating device the heated air is guided with blowers directly to the steam generator and/or to a thermocline storage device. The storage device serves as a compensation means for differences between the energy supply and usage over time and is switched in parallel to the steam generator.

In certain devices according to FIGS. 4–7 on pages 4–41 of the aforementioned book a burner operated with fossil fuels is arranged upstream of the steam generator. With such a burner the production of electricity in cooperation with the thermocline storage device can be maintained when no solar energy is present or no heat energy can be removed from the storage device. In the known devices the receiver, with which the solar radiation collected with a solar panel field is concentrated, is arranged on top of a high tower and the steam generator is positioned at the bottom of the tower.

The steam generator used for producing steam requires with respect to its service life and with respect to protection of the steam turbine loaded therewith a substantially constant air inlet temperature and a substantially constant air mass flow at least within short time intervals. This can not be insured with an air heating device because it can only be operated either with a constant mass flow or a with a constant air outlet temperature. For a constant mass flow the air outlet temperature changes with the changing solar radiation received by the solar panel field. Temperature fluctuations of the heated air may occur when clouds suddenly cover the large surface area of the solar panel field because the temperature of the air leaving the air heating device then drops. This results in a change of the average temperature with which the steam generator is loaded as well as in a change of the three dimensional temperature profile, especially when only a portion of the solar panel field is shaded by clouds. It has been shown that the conventionally used absorber for the air heating device in the form of woven metal etc. have a to low storage effect so that a change of the radiation energy very quickly effects the air outlet temperature. For a controlled and thus constant air outlet temperature the mass flow is the variable parameter.

It is thus the object of the present invention to provide a method of the aforementioned kind with which a quasi stationary operation of the steam generators/turbine is possible, i.e., an operation with such temperature transients that are acceptable to the steam generator/steam turbine.

SUMMARY OF THE INVENTION

The method for generating steam with concentrated solar radiation according to the present invention is primarily characterized by:

Heating an absorber by solar radiation;

Directing a stream of air through the absorber to produce a heated air stream;

Guiding the heated air stream through a heat storage device provided for the compensation of short-term temperature fluctuations;

Generating steam with the heated air stream and simultaneously cooling the heated air stream to produce a cooled air stream; and Returning at least a portion of the cooled air stream to an upstream side of the absorber.

Preferably, the method further comprises the steps of burning a fuel to produce a hot gas stream and mixing the hot gas stream into the heated air stream.

Advantageously, the hot gas stream is the flue gas of a gas turbine.

Preferably, the method further comprises the step of burning a fuel in the heated air stream.

Advantageously, the fuel is a gaseous fuel and the gaseous fuel is burned in self-ventilating burners.

In an alternative embodiment of the present invention the method is primarily characterized by the following steps:

Heating an absorber by solar radiation;

Directing a stream of air through the absorber to produce a heated air stream;

Burning a fuel to produce a hot gas stream and mixing the hot gas stream into the heated air stream to form a mixed air/gas stream;

Generating steam with the mixed air/gas stream and simultaneously cooling the mixed air/gas stream to produce a cooled/gas stream; and Returning at least a portion of the cooled air/gas stream to an upstream side of the absorber.

Advantageously, the second method further comprises the step of guided the heated air stream through a heat storage device provided for the compensation of short-term temperature fluctuations.

Preferably, the hot gas stream is the flue gas of a gas turbine.

Advantageously, in the step of burning the fuel is burned in the heated air stream.

Preferably, the fuel is a gaseous fuel and is burned in self-ventilating burners.

The present invention also relates to a solar apparatus in which an absorber is heated by solar radiation, a stream of air is directed through the absorber to produce a heated air stream, steam is generated with the heated air stream and simultaneously the heated air stream is cooled to produced a cooled air stream, and at least a portion of the cooled air stream is returned to an upstream side of the absorber. The inventive solar apparatus is primarily characterized by:

A tower;

An air heating device comprising a solar radiation absorber connected to the top of the tower;

An air inlet for introducing air into the air heating device;

A steam generator connected to the tower downstream of the air heating device;

A steam generator connected to the tower downstream of the air heating device;

A heated air stream channel arranged at the tower for connecting the air heating device to the steam generator for guiding the heated air stream from the air heating device to the steam generator;

A blower connected at the tower downstream of the steam generator;

A connecting line arranged at the tower for connecting the steam generator to the blower; and A return line arranged at the tower for connecting the blower to the air inlet and returning at least a portion of the cooled air stream to the air heating device.

Preferably, the air heating device has a substantially circular cross-section and is loadable about its the periphery, wherein the air heating device is divided into a plurality of circumferentially sequentially arranged sectors, with each sector having a means for independently controlling the air flow.

Expediently, the steam generator is positioned below the air heating device. The heated air stream channel is centrally arranged within the air heating device for removing the heated air stream from an upper end of the air heating device downwardly into the steam generator. The return line is comprised of at least one return channel connected to the exterior of the steam generator.

In a preferred embodiment of the present invention, between the air heating device and the heated air stream channel an annular chamber is defined and the annular chamber is cooled by natural ventilation.

Preferably, the blower is an axial blower.

Advantageously, the solar apparatus further comprises a ring chamber arranged about the lower end of the air heating device and having a top with an outlet slot. The return line opens into the ring chamber and the cooled air stream exits the ring chamber through the outlet slot so that cooled air flows along the surface of the air heating device. Preferably, the width of the outlet slot is adjustable.

Expediently, the solar apparatus further comprises a heat storage device for the compensation of short-term temperature fluctuations. The storage device is positioned in the heated air channel.

Advantageously, the solar apparatus further comprises a channel burner arranged within the heated air channel. The channel burner is preferably comprised of a plurality of burner modules that mesh with one another in a comb-like fashion.

Expediently, the heated air channel comprises an inlet for receiving flue gas from the gas turbine arrangement.

The above devices, i.e., the heat storage device, the channel burner, and the inlet for flue gas from a gas turbine arrangement, can be used individually or in any desired combination.

According to the method of the present invention, the heated air stream exiting from the absorber is introduced, before generating steam and cooling, into a heat storage device for compensating short-term temperature fluctuations and/or a heated gas stream which results from combustion of fuel is mixed into the heated air steam.

The so-called short-term heat storage device can not be compared to the known main storage devices which are switched in parallel to the steam generator because such short-term heat storage devices have the function of compensating short-term temperature fluctuations (for example, resulting from shading of the solar panels by clouds) and to compensate temperature peaks.

Due to the heat storage device which is arranged downstream of the air heating device, temperature transients can be dampened so that the unfavorable loading of the steam generator with respect to fast temperature fluctuations is reduced. Further-more, the storage device can ensure a mixing of temperature strands within the heated air stream in order to achieve a uniform temperature profile.

The following requirements are to be fulfilled by such a short-term heat storage device. Pressure loss should be small so that the output of the blower responsible for air transport can be reduced. This can be achieved by providing a heat storage device of a great cross-section which is of a short length in the flow direction within the heated air stream. However, it must be taken into consideration that the temperature compensation ability of the heat storage device will deteriorate with reduced constructive height (length).

The heat transfer efficiency must be sufficiently great in order to ensure that an inlet temperature jump can be recognized only as a continuous monotonous decreasing temperature transient at the short-term heat storage device. The length (height) of the short-term heat storage device should correspond approximately to the length of the thermocline zone during full load of the steam generator which is determined by its material, heat transmission coefficient and cross-section in order to provide for a sufficient damping, on the one hand, and for a sufficiently fast temperature change at the exit side, on the other hand.

The heat capacity is to be selected such that the short-term heat storage device dampens sufficiently under full load, but, on the other hand, does not cause an unnecessary sluggishness of the system, especially does not cause delay during the start-up procedure of the steam generator and the turbine arranged downstream thereof. With an expedient embodiment of the flow paths within the storage material it can be achieved that the heated air stream flows as within a baffled heat exchanger (deflecting segments or deflecting rings/discs) so that temperature strands can be broken up reliably and improved mixing can be achieved.

It is advisable not to use hollow storage elements as a storage material but solid elements. This results in a higher volume usage and, for the same amount of storage material, it reduces pressure loss for the heated air stream flowing therethrough.

Scaling resistent steel, ceramic or natural stone may be used as the storage material.

In the context of the present invention "short term" refers to time periods within the minute range.

Instead of a short-term heat storage device it is also possible to burn a corresponding amount of fuel within the heated air stream when temperature fluctuations occur. In this scenario the mass flow of air introduced from the receiver remains constant and the temperature is changed. The additional flue gas mass flow resulting from the combustion is negligible in comparison to the heated air mass flow. By generating heat directly upstream of the steam generator, the amount of heat energy that is required for a quasi stationary, respectively, continuous operation of the steam generator/turbine is provided which heat energy can not be supplied momentarily by solar energy or by a more expensive main storage device. The inventive method thus dispenses with expensive main, respectively, long-term storage devices because these devices only result in a displacement of the energy usage, but do not provide for an active compensation for energy generation.

It is especially advantageous when the heated air stream flows first through the short-term heat storage device and subsequently, if needed, a fuel is burned within the heated air stream because by doing so a quasi-stationary operation of the steam generator/turbine is possible in an especially expedient manner. When the requirements of the combustion device for combusting the fuel within the heated air stream with respect to a constant temperature of the heated air stream are lower than the requirements of the steam generator with respect to a constant temperature, it is feasible to divide the short-term heat storage device and to arrange a portion thereof upstream of the fuel combustion device within the heated air stream and a portion downstream thereof. This has the advantage that the pressure loss of the portion of the short-term heat storage device upstream of the combustion location can be used for compensating possible temperature strands downstream of the combustion device.

However, it is also possible to achieve a compensation of short-term temperature fluctuations such that an additional gas is mixed into the heated air stream whereby this additional gas is the flue gas of a gas turbine. In this scenario, the air heating device is controlled to have a constant exit temperature of the heated air stream by adapting the air mass flow to the momentary solar radiation intensity. The gas turbine exit temperature is controlled with respect to the exit temperature of the air heating device and the mass flow of the gas turbine or a partial stream of the flue gas of the gas turbine is controlled such that the total mass flow, after mixing of the flue gas exiting from the steam generator, remains constant. This means that always such an amount of flue gas is mixed into the heated air stream as is needed by the heated air stream coming from the air heating device.

As mentioned above, it is possible to use the short-term heat storage device together with combustion of fuel within the heated air stream. It is also possible to use the short-term heat storage device together with mixing of flue gas into the heated air stream. In this context it is expedient that the short-term heat storage device is arranged downstream of the inlet location of the flue gas into the heated air stream because the short-term heat storage device is then able to reduce control fluctuations and temperature transients and temperature strands resulting from the mixing of the flue gas into the heated air stream.

The present invention also relates to a solar apparatus in which a stream of air is directed through an absorber of an air heating device arranged on a tower, which absorber is heated by solar radiation, in order to be heated, cooling the heated air stream in a steam generator and returning at least a portion of the cooled air stream with a blower to the upstream side of the absorber.

As mentioned above, in known solar apparatus steam generator and blower are arranged at the bottom of the tower. Due to the long lines with which the heated air stream is guided to the steam generator at the bottom of the tower and the cooled air is returned to the air heating device at the top of the tower, high costs and also heat losses result. Furthermore, a high blow output is required resulting from the frictional pressure loss and the lift due to the density differences between the air of the heated air stream and the air of the cooled air stream.

The disadvantages are inventively avoided by arranging the air heating device, the steam generator, and the blower together with the connecting channels for the heated air stream and the return air stream of cooled air as a constructive unit on the tower.

Advantageously, the air heating device is a device that can be loaded about its periphery and has a substantially circular cross-section. The air heating device is advantageously divided in the circumferential direction into a plurality of sectors with separate mass flow control. By dividing the air heating device into a plurality of sectors, the air heating device can be adapted to the radiation flow density distribution which moves during the day about the air heating device according to the changing position of the sun.

Furthermore, it is expedient to remove the air heated within the air heating device within the upper area of the air heating device via a centrally arranged heated air channel and to guide the heated air stream into the steam generator which is positioned below the air heating device. The cooled air stream exiting the bottom side of the steam generator is advantageously returned via channels arranged at the exterior of the steam generator to the air heating device.

The removal of heated air at the upper portion of the air heating device can be constructively achieved in a simple manner when the air heating device has a downwardly tapering conical configuration because in such an embodiment an individual channel flow into the centrally arranged heated air channel can be provided within the upper portion.

The annular chamber between the centrally arranged heated air channel and the inner side of the absorber within the heating device may be cooled by natural venting in order to be able to dissipate heat energy introduced by heat radiation and heat conduction.

For the arrangement of the steam generator on the tower it is also possible in a simple manner to provide for compensation of short-term temperature fluctuation of the heated air stream by positioning a heat storage device within the heated air channel and/or by arranging a channel burner device and/or by providing the heated air channel with an inlet for receiving flew gas from a gas turbine arrangement. The gas turbine, depending on its weight, can also be arranged on the tower. If this is not possible due to too great a weight of the gas turbine a flue gas inlet line must be provided that extends from the external gas turbine to the tower.

The blower used for conveying the air is preferably an axial blower. For such a blower the blade arrangement and adjustment provides a sufficiently large control range with only small efficiency losses and the small moved masses allow for a fast acting control. The symmetric construction of an axial blower can be easily integrated into the constructive design of the constructive unit (see above definition) on the tower. Furthermore, with an axial blower the danger of oscillation excitation on a high tower is low. For the return of the cooled air stream it is advantageous to have the return line open into a ring channel which is located at the lower end of the air heating device. This ring channel allows passage therethrough and exiting therefrom via an upwardly open outlet slot toward the surface of the absorber whereby advantageously the width of the outlet slot can be adjusted in a circumferential direction. This allows for an adaptation of the distribution of the cooled air stream over the periphery of the absorber with respect to the azimuthal radiation density profile and wind that entrains the cooled air about the periphery of the heating device.

BRIEF DESCRIPTION OF THE DRAWINGS

The object and advantages of the present invention will appear more clearly from the following specification in conjunction with the accompanying drawings, in which:

FIG. 6 is a verticle side view of a storage material packing for a short term storage device in one particular embodiment.

DESCRIPTION OF PREFERRED EMBODIMENTS

The present invention will now be described in detail with the aid of several specific embodiments utilizing FIGS. 1–6.

Figure 1:
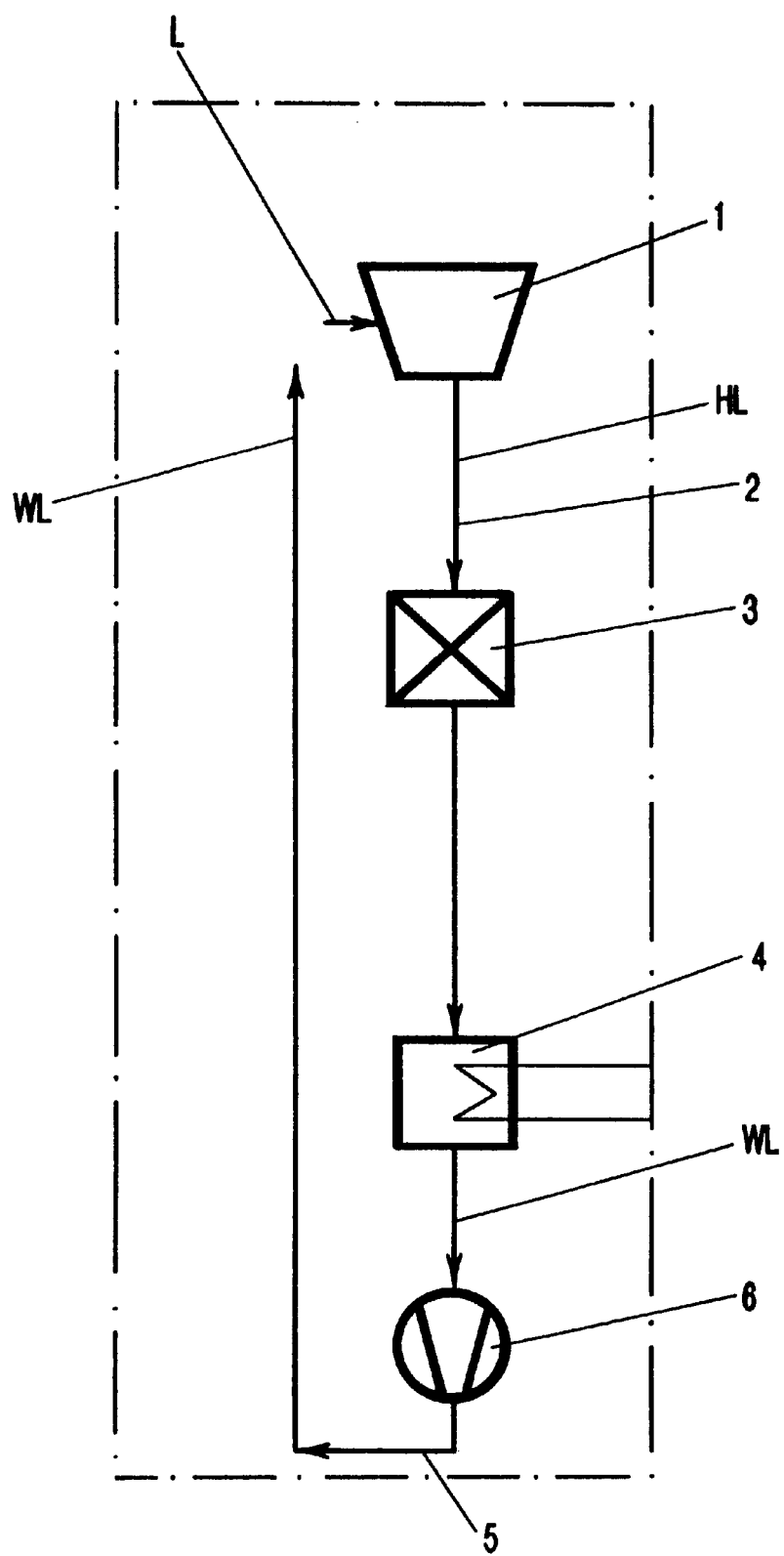
FIG. 1 shows a block diagram of a first solar apparatus with short-term heat storage device for a quasi-stationary operation.

In the process according to FIG. 1 atmospheric air L is sucked into a volumetric air heating device 1 and heated air stream HL is directed via a heated air channel 2 and a short-term heat storage device 3 into a steam generator 4. The cooled air stream WL resulting from the generation of steam within the steam generator 4 is returned via at least one cooled air channel (return air channel) 5, in which preferably an axial blower 6 is arranged, to the suction side (upstream side) of the air heating device. A heated air stream thus continuously flows through the short-term heat storage device 3 and temperature fluctuations within the heated air stream guided into the storage device 3 are thus compensated. The steam generator 4 may be operated by natural circulation, forced circulation, or forced throughput.

Figure 2:
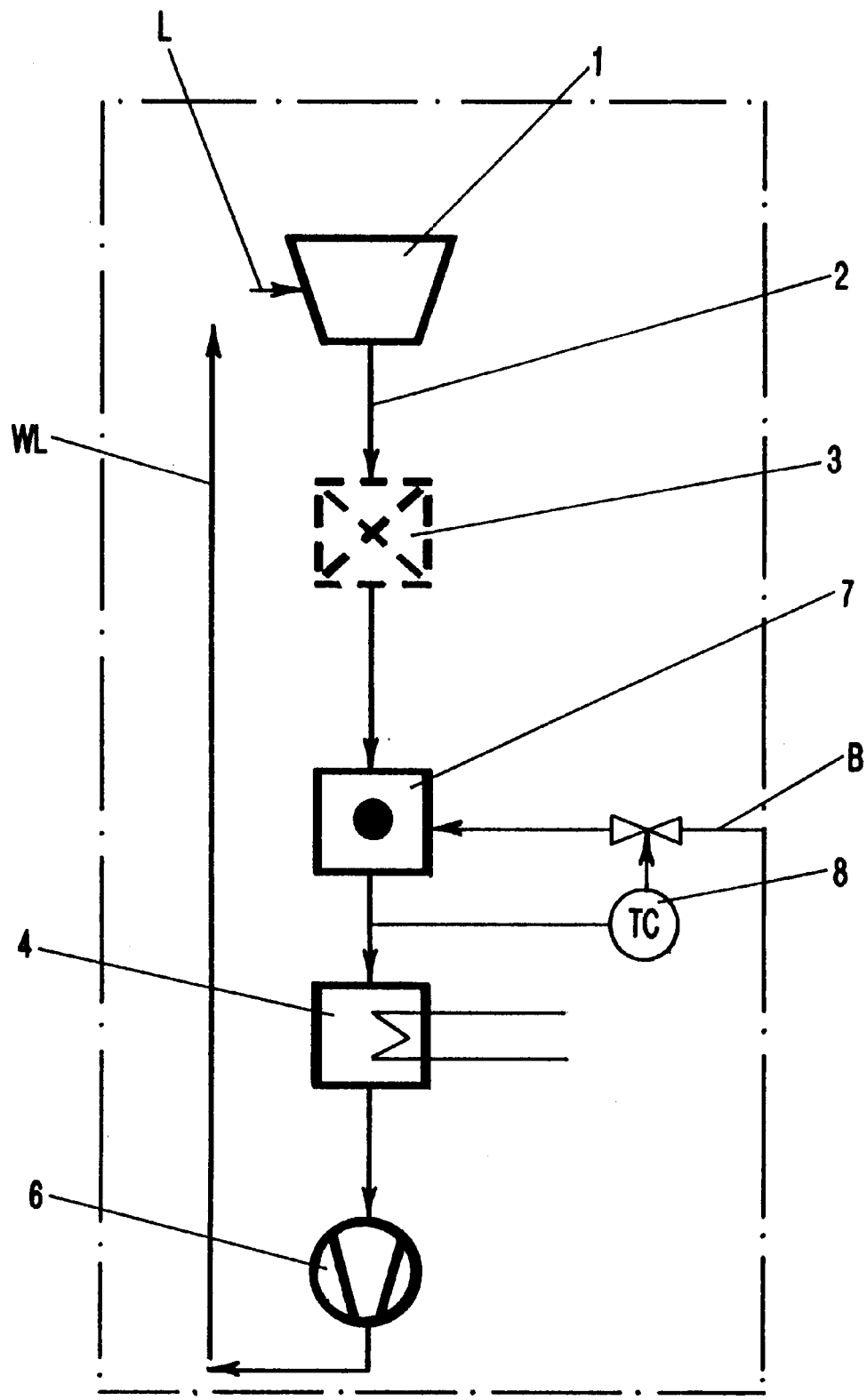
FIG. 2 shows a block diagram with a burner for a quasi-stationary operation.

In FIG. 2 the same reference numeral are used for same parts as in FIG. 1.

Between the air heating device 1 and the steam generator 4 a (channel) burner 7 is arranged for a quasi-stationary operation of the steam generator 4 and the turbine (not represented) arranged downstream thereo. The burner 7 is operated with fuel B, preferably gas. The burner generates directly in front of the steam generator 4 the required heat energy which is needed for a quasi-stationary, respectively, continuous operation of the steam generator. Preferably, the burner (combustion device) is in the form of the self-venting burner, i.e., the supplied fuel is burned with the heated air stream. This makes it possible that the temperature as well as the mass flow of the air stream can be kept constant independent of the output distribution between the air heating device 1 and the combustion device 7. A measuring and control device 8 measures the temperature at the inlet of the steam generator and controls the fuel supply to the combustion device 7 as a function of the measured temperature.

A short-term heat storage device 3 is represented in dashed lines in FIG. 2. The storage device 3 is arranged upstream of the combustion device. It is thus possible to operate the solar apparatus with a combination of the short-term storage device and the combustion device (burner) 7. In FIG. 2 the short-term heat storage device 3 is arranged upstream of the combustion device 7. However, it is also possible to divide the short-term storage device and to arrange a portion thereof downstream of the combustion device 7. Due to the pressure loss of the up stream portion of the short-term heat storage device a compensation of temperatures strands downstream of the combustion device can be achieved since combustion device usually comprises a plurality of flames distributed over the cross-section of the heated air channel 2. Of course, the combustion device must not be operated continuously, but only then when temperature fluctuations or an insufficient radiation intensity at the air heating device make it necessary to operate it. With the assistance of the combustion device it is thus not only possible to compensate short-term temperature fluctuations, but also to compensate for a longer term radiation deficit, if it is desired to compensate it.

Figure 3:
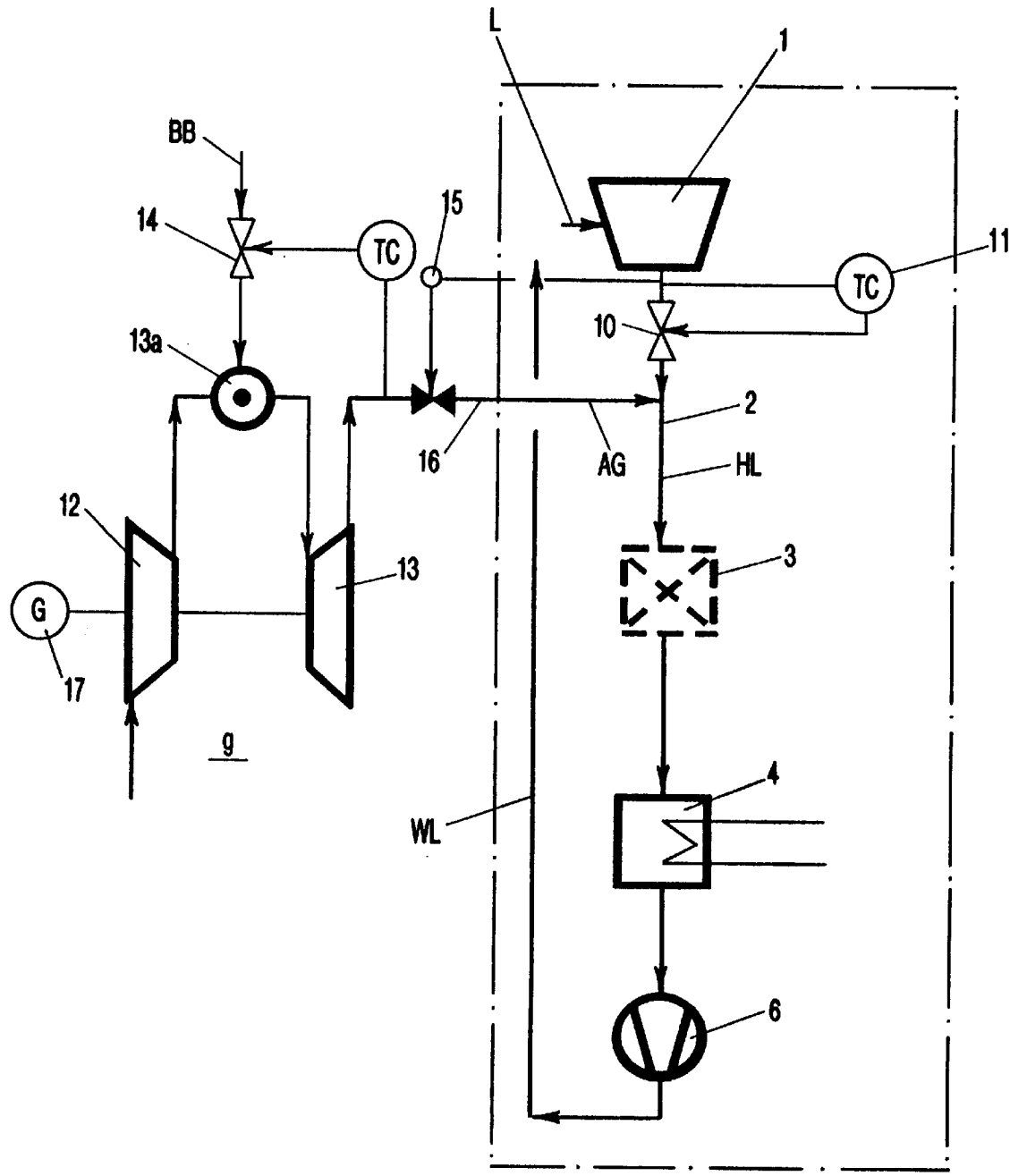
FIG. 3 shows a block diagram with a coordinated gas turbine device for a quasi-stationary operation.

In the embodiment according to FIG. 3 a gas turbine arrangement 9 is used instead of the combustion device 7. In this case, a control valve 10 is arranged in the heated air channel 2 between the air heating device 1 and the steam generator 4. The control valve 10 together with a measuring and control device 11 makes possible a constant exit temperature at the outlet of the valve by adjusting the air mass flow guided through the air heating device to the momentary radiation intensity of the concentrated solar radiation.

The gas turban arrangement 9 is comprised of a compressor 12, a gas turbine combustion chamber 13a, and a gas turbine 13. The combustion chamber 13a is supplied with fuel BB whereby the supply is controlled by a measuring and control unit 14 such that the exit temperature of the turbine flue gas can be adjusted to the same value as the air exiting from the air heating device. The mass flow of the turbine flue gas is controlled such by a measuring and control unit 15 that the total mass flow of the flue gas stream supplied via line 16 downstream of the valve 10 remains constant, i.e., the gas turbine arrangement 9 supplies always the amount of flue gas AG that is required based on the reduced amount of air mass flow produced within the air heating device as a function of the momentary radiation intensity.

As can be seen in FIG. 3, upstream of the inlet location of the flue gas channel 16 a short-term heat storage device 3 maybe arranged which reduces control fluctuation and also temperature transients and strands.

The gas turbine arrangement 9 also comprises a generator 17 driven by the gas turbine 13. In this design the output of the solar power station is increased upon reduction of the solar radiation intensity because the higher gas turbine output is added to the constant steam turbine output. This can be especially advantageous in connection with an electric supply network in which power stations that are solely operated by solar power, i.e., power stations without additional gas turbine arrangements, are used because the output characteristics of the two types of power stations can be compensated. During reduced solar radiation the output of the solar power station is reduced and the output of the combined gas turbine/solar power station is increased.

The arrangement of FIG. 3 can also be provided with an additional burner. In FIGS. 1–3 the components that are inventively combined as a constructive unit and as a unit arranged on the tower of a solar power station are enclosed by dash-dotted lines, i.e., it is suggested to arrange all components of the heat transfer medium circuit as a constructive unit on the tower, i.e., air heating device 1, short-term heat storage device 3 as well as, if present, combustion device 7, steam generator 4, blower 6, heated air channel 2, and cooled (return) air channel 5.

Figure 4:
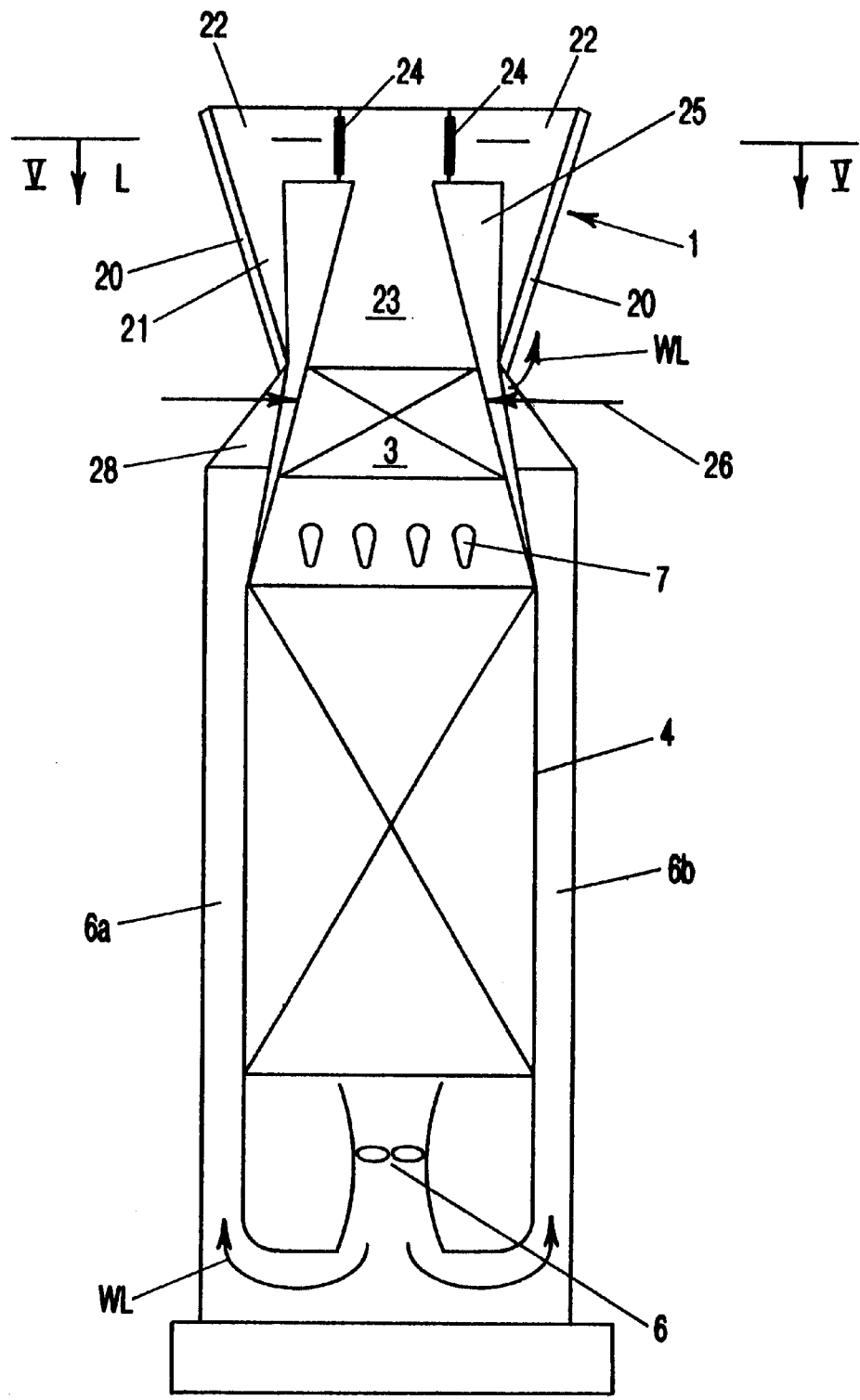
FIG. 4 shows a solar apparatus constructive unit for a combinations of the methods of FIGS. 1 and 2 arranged on the tower of a solar power station.
Figure 5:
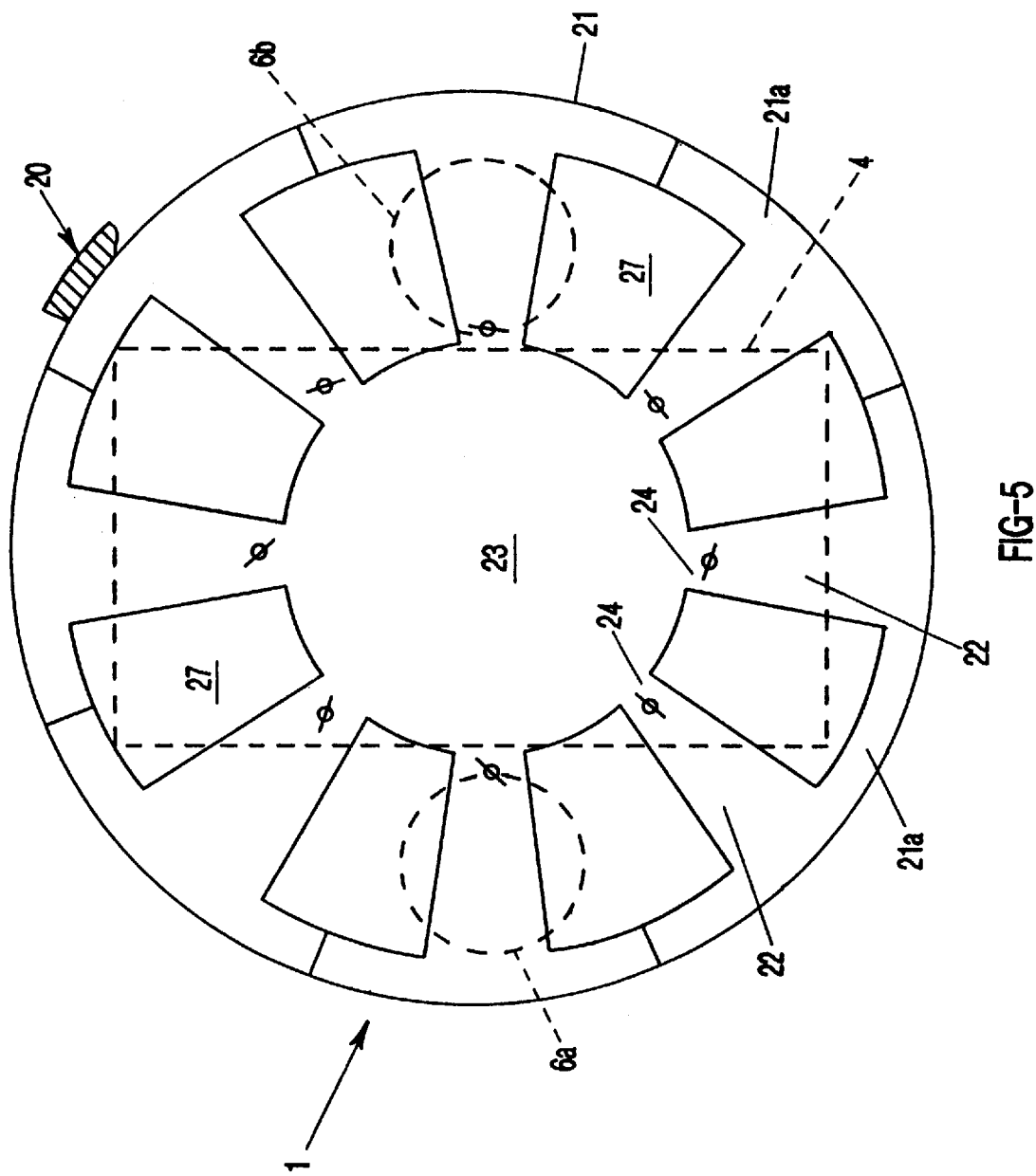
FIG. 5 is a horizontal section of the constructive unit according to FIG. 4 viewed in the direction of arrows V—V.

In FIGS. 4 and 5 such a constructive unit is represented. The air heating device 1 is preferably embodied with a conical outer contour that is determined by the absorber 20 inserted into the air heating device 1. The conical outer contour tapers downwardly. The air sucked through the absorber 20 is guided upwardly via an annular chamber 21, divided into a plurality of sectors 21a, into gas channels 22. These gas channels 22 guide the heated air stream into a centrally arranged heated air channel 23 and in the downward direction. The individual sectors 21, respectively, the gas channels 22 have arranged thereat control flaps 24 which adjust the air throughput of the individual sectors 21a. By adjusting the flaps 24 the throughput of individual absorber sections can be adjusted to the radiation flow density distribution that changes during the day about the heating device according to the changing position of the sun.

The annular chamber 25 positioned between the centrally arranged heated air channel 23 and the sectors 21 may be subjected to natural venting. The air flow for natural venting enters through openings 26 arranged below the air heating device within the housing of the constructive unit and flows via free spaces 27 between the gas channels 22 upwardly. Below the air heating device of a circular symmetrical arrangement a steam generator 4 of a preferably parallel-epipedal design is arranged which is supplied with the heated air stream via the heated air channel 23 having a cross-section that widens. Within the heated air channel a short-term heat storage device 3 and a channel burner 7 are arranged which function as explained in connection with FIGS. 1–3. Below the steam generator 4 an axial blower 6 is arranged. The cooled air stream sucked in by the axial blower 6 is guided via two cooled air channels 6a and 6b extending over the two longitudinal sides of the steam generator 4 into a ring chamber 28 that is arranged below the air heating device 1. The ring chamber 28 is provided at its upper side with an outlet slot that allows flow of air parallel to the surface of the absorber 20. The width of the outlet slot is preferably adjustable in the circumferential direction in order to allow for an adaptation of the distribution of the cooled air WL to the azimuthal radiation flow density profile and optionally to wind flowing about the air heating device.

FIG. 6 shows an especially advantageous arrangement of the storage material within the short-term storage device 3. The flow direction is indicated by arrows HL. The short-term storage device 3 can, as explained above, be comprised of different materials. The configuration represented in FIG. 6 is comprised of flat metal strips arranged in a grid-type arrangement and made of a metal that is scale-resistant. The metal strips 30a with rectangular cross-section are arranged adjacent to one another and rest with their narrow sides on supports 30c. On their upper sides the longitudinal sides of metal strips 30b rest so as to be spaced at a distance from one another. Their direction of extension is perpendicular to the direction of extension of the metal strips 30a. A plurality of layers of metal strips 30a and 30b is provided which are enclosed by a sheet metal housing 30d defining the heated air channel 2. The grid-structure serves to break up temperature strands within the heated air stream HL and provides for a good mixing. By using solid material higher volume usage is provided. By using metal a heating capacity is achieved which provides the short-term heat storage device with a sufficient dampening action in a period of minutes during a full load, but does not cause unnecessary sluggishness within the system. Porous ceramic bodies, flowable materials made of metal or ceramic elements, or configuration of other metal profiled members can be used.

The present invention is, of course, in no way restricted to the specific disclosure of the specification, examples, and drawings, but also encompassed any modification within the scope of the appendant claims.

What I claim is:

1. A method for generating steam with concentrated solar radiation in a steam generator, said method comprising the steps of:

heating an absorber by solar radiation;

directing a stream of air through the absorber to produce a heated air stream;

guiding the heated air stream through a short-term heat storage device provided for the compensation of short-term temperature fluctuations, wherein a temperature fluctuation at the inlet of the short-term heat storage device is transformed into a continuously and monotonously decreasing temperature at the exit of the short-term heat storage device;

determining a length of the short-term heat storage device in the flow direction of the heated air to be substantially identical to the length of the thermocline zone of said short-term heat storage device during full load of the steam generator, wherein the length of the thermocline zone is determined by the material, heat transmission coefficient, and cross-section of the short-term heat storage device;

generating steam with the heated air stream in the steam generator and simultaneously cooling the heated air stream to produce a cooled air stream; and returning at least a portion of said cooled air stream to an upstream side of the absorber.

2. A method according to claim 1, further comprising the steps of burning a fuel to produce a hot gas stream and mixing the hot gas stream into the heated air stream.

3. A method according to claim 2, wherein the hot gas stream is the flue gas of a gas turbine.

4. A method according to claim 1, further comprising the step of burning a fuel in the heated air stream.

5. A method according to claim 4, wherein the fuel is a gaseous fuel and wherein the gaseous fuel is burned in self-ventilating burners.

6. A method for generating steam with concentrated solar radiation in a steam generator, said method comprising the steps of:

heating an absorber by solar radiation;

directing a stream of air through the absorber to produce a heated air stream;

burning a fuel to produce a hot gas stream and mixing the hot gas stream into the heated air stream to form a mixed air/gas stream;

generating steam with the mixed air/gas stream in the steam generator and simultaneously cooling the mixed air/gas stream to produce a cooled air/gas stream; and returning at least a portion of said cooled air/gas stream to an upstream side of the absorber;

guiding the heated air stream through a short-term heat storage device provided for the compensation of short-term temperature fluctuations, wherein a temperature fluctuation at the inlet of the short-term storage device is transformed into a continuous monotonous decreasing temperature transient at the exit of the short-term heat storage device; and selecting a length of the short-term heat storage device in the flow direction of the heated air to correspond to the length of the thermocline zone of the steam generator during full load of the steam generator which length of the thermocline zone is determined by the material, heat transmission coefficient, and cross-section of the steam generator.

7. A method according to claim 6, wherein the hot gas stream is the flue gas of a gas turbine.

8. A method according to claim 6, wherein in the step of burning the fuel is burned in the heated air stream.

9. A method according to claim 8, wherein the fuel is a gaseous fuel and wherein the gaseous fuel is burned in self-ventilating burners.

10. A solar apparatus in which an absorber is heated by solar radiation, a stream of air is directed through the absorber to produce a heated air stream, steam is generated with the heated air stream and simultaneously the heated air stream is cooled to produce a cooled air stream, and at least a portion of the cooled air stream is returned to an upstream side of the absorber; said solar apparatus comprising:

a tower;

an air heating device comprising a solar radiation absorber connected to the top of said tower;

an air inlet for introducing air into said air heating device;

a steam generator connected to said tower downstream of said air heating device;

a heated air stream channel arranged at said tower for connecting said air heating device to said steam generator for guiding the heated air stream from said air heating device to said steam generator;

a blower connected at said tower downstream of said steam generator;

a connecting line arranged at said tower for connecting said steam generator to said blower;

a return line arranged at said tower for connecting said blower to said air inlet and returning at least a portion of the cooled air stream to said air heating device; and a short-term heat storage device, for the compensation of short-term temperature fluctuations, positioned in said heated air channel, wherein said heat storage device transforms a temperature fluctuation at an inlet of said heat storage device into a continuously and monotonously decreasing temperature at an exit of said heat storage device, and wherein a length of said heat storage device in the flow direction of the heated air is substantially identical to the length of the thermocline zone of said short-term heat storage device during full load of said steam generator, wherein the length of said thermocline zone is determined by the material, heat transmission coefficient, and cross-section of said short-term heat storage device.

11. A solar apparatus according to claim 10, wherein said air heating device has a substantially circular cross-section and is loadable about the periphery thereof, wherein said air heating device is divided into a plurality of circumferentially sequentially arranged sectors, with each said sector having a means for independently controlling the air flow.

12. A solar apparatus according to claim 11, wherein:

said steam generator 4 is positioned below said air heating device;

said heated air stream channel is centrally arranged within said air heating device for removing the heated air stream from an upper end of said air heating device downwardly into said steam generator; and said return line comprised of at least one return channel connected to the exterior of said steam generator.

13. A solar apparatus according to claim 12, wherein between said air heating device and said heated air stream channel an annular chamber is defined and said annular chamber is cooled by natural ventilation.

14. A solar apparatus according to claim 10, wherein said blower is an axial blower.

15. A solar apparatus according to claim 10, further comprising a ring chamber arranged about a lower end of said air heating device and having a top with an outlet slot, wherein said return line opens into said ring chamber, and wherein the cooled air stream exits said ring chamber through said outlet slot and flows along the surface of said air heating device.

16. A solar apparatus according to claim 15, wherein a width of said outlet slot is adjustable.

17. A solar apparatus according to claim 10, further comprising a channel burner arranged within said heated air channel.

18. A solar apparatus according to claim 17, wherein said channel burner is comprised of a plurality of burner modules that mesh with one another in a comb-like fashion.

19. A solar apparatus according to claim 17, wherein said heated air channel comprises an inlet for receiving flue gas from a gas turbine arrangement.

20. A solar apparatus according to claim 10, wherein said heated air channel comprises an inlet for receiving flue gas from a gas turbine arrangement.

21. A solar apparatus according to claim 10, further comprising a channel burner arranged within said heated air channel.

22. A solar apparatus according to claim 21, wherein said channel burner is comprised of a plurality of burner modules that mesh with one another in a comb-like fashion.

23. A solar apparatus according to claim 21, wherein said heated air channel comprises an inlet for receiving flue gas from a gas turbine arrangement.

24. A solar apparatus according to claim 10, wherein said heated air channel comprises an inlet for receiving flue gas from a gas turbine arrangement.

* * * * *

UNITED STATES PATENT AND TRADEMARK OFFICE
CERTIFICATE OF CORRECTION

PATENT NO. : 5,904,138
DATED : May 18, 1999
INVENTOR(S) : Keintzel et al

It is certified that error appears in the above-indentified patent and that said Letters Patent is hereby corrected as shown below:

Claim 6:

line 38, "continuous" should be -- continuously and --, and "monotonous" should be -- monotonously --;

line 39, delete "transient";

line 41, delete "selecting" and in place thereof, insert -- determining --;

line 42, after "to" (first occurrence), insert -- be substantially identical --, and delete "correspond";

line 43, delete "the steam generator" and in place thereof, insert -- said short-term heat storage device --;

line 44, after "generator" insert -- , wherein the --, and delete "which";

line 47, delete "steam generator" and in place thereof, insert -- short-term heat storage device --.

Signed and Sealed this

Second Day of November, 1999

Attest:

Q. TODD DICKINSON

Attesting Officer

Acting Commissioner of Patents and Trademarks